May 14, 1963 E. RULE 3,089,343
TRANSDUCER DEVICES EMPLOYING A FLUID FILM FOR IMPROVEMENT
OF SENSITIVITY AND FREQUENCY RESPONSE CHARACTERISTICS
Filed Aug. 4, 1960 5 Sheets-Sheet 1
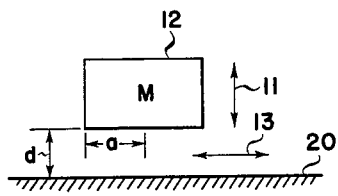
Fig. 1
Fig. 3
Fig. 2
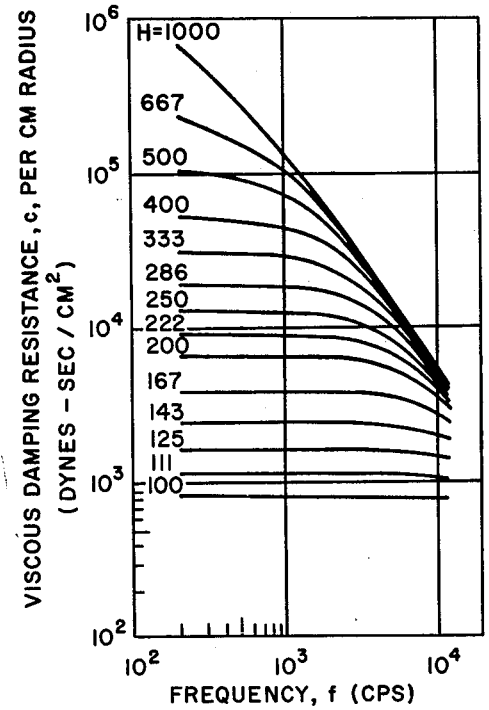
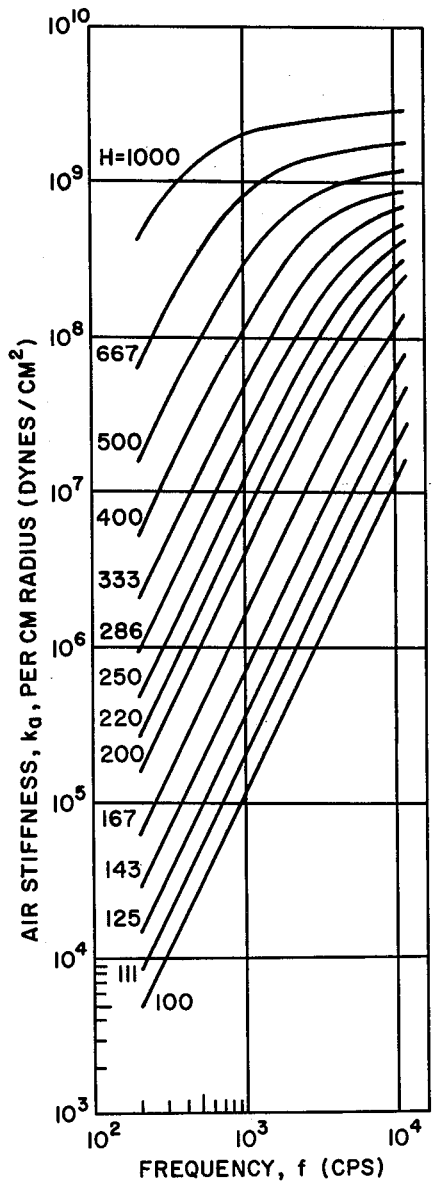
*INVENTOR.*
Eric Rule
BY
*George C. Sullivan*
Agent INVENTOR.
ERIC RULE
BY
George C. Sullivan
Agent INVENTOR.
ERIC RULE
BY
*George C. Sullivan*
Agent

INVENTOR.
ERIC RULE

3,089,343
TRANSDUCER DEVICES EMPLOYING A FLUID FILM FOR IMPROVEMENT OF SENSITIVITY AND FREQUENCY RESPONSE CHARACTERISTICS

Eric Rule, Atherton, Calif., assignor to Lockheed Aircraft Corporation, Burbank, Calif.
Filed Aug. 4, 1960, Ser. No. 47,548
6 Claims. (Cl. 73—516)

This invention relates generally to transducer devices and more particularly to means and methods for improving the sensitivity and frequency response characteristics thereof.

The operating frequency range of a transducer is ordinarily limited to the frequency range over which its response curve is substantially constant. In many applications this operating frequency range is far too narrow, particularly for the simpler types of transducers. Increases in the operating frequency range have been possible only at considerable loss of sensitivity and/or by the use of complex means to change or compensate for deficiencies in the transducer frequency response.

Accordingly, it is the primary object of this invention to provide simplified means and methods for improving the sensitivity and frequency response of a transducer.

This primary object is basically accomplished in accordance with the present invention by incorporating a specially chosen fluid film in a second order transducer system in a manner so that the dynamic characteristics of the fluid film act to extend the operating frequency range of the transducer without reducing its inherent sensitivity. The increased operating frequency range achieved thus permits a smaller natural frequency to be employed in order to obtain a given operating frequency range, thereby making possible a greater system sensitivity, since the sensitivity of a system is inversely proportional to the square of its natural frequency. By means of such a fluid film, I have been able to increase the maximum possible operating frequency of a conventional second order transducer system having optimum damping from a maximum of 0.8 of the natural frequency (response constant within ±5%) to a maximum of 1.5 of the natural frequency, an increase of nearly 2 to 1, which corresponds to an increase in sensitivity for a given operating frequency range of almost 4 to 1. For a conventional second order system with no damping (which is difficult to provide at high frequencies) the increase in frequency range is greater than 7:1 corresponding to an increase in sensitivity for a given frequency range of greater than 50 to 1.

The specific nature of the invention as well as other objects, uses and advantages thereof will clearly appear from the following description and the accompanying drawing in which:

FIG. 1 is a schematic diagram illustrating the properties of a fluid film.

FIGS. 2 and 3 are graphs showing the viscous damping resistance $c$ per unit radius and the stiffness $k_a$ per unit radius versus frequency for air films of various dimensions.

Figure 8:
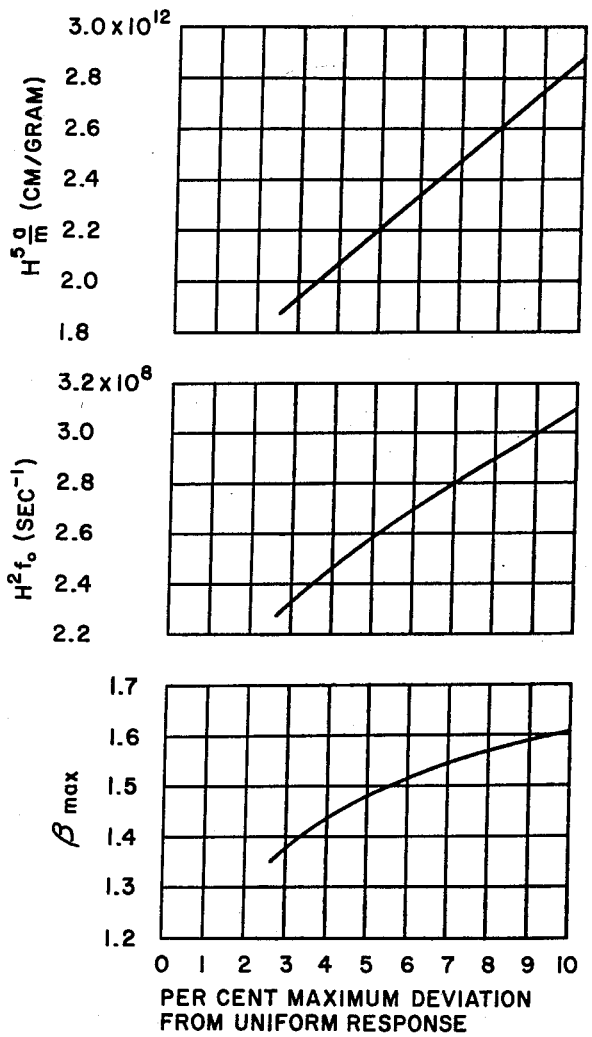

FIG. 8 comprises three graphs which may be employed in designing a second order transducer system which makes use of a fluid film for frequency response control in accordance with the invention.

Figure 9:
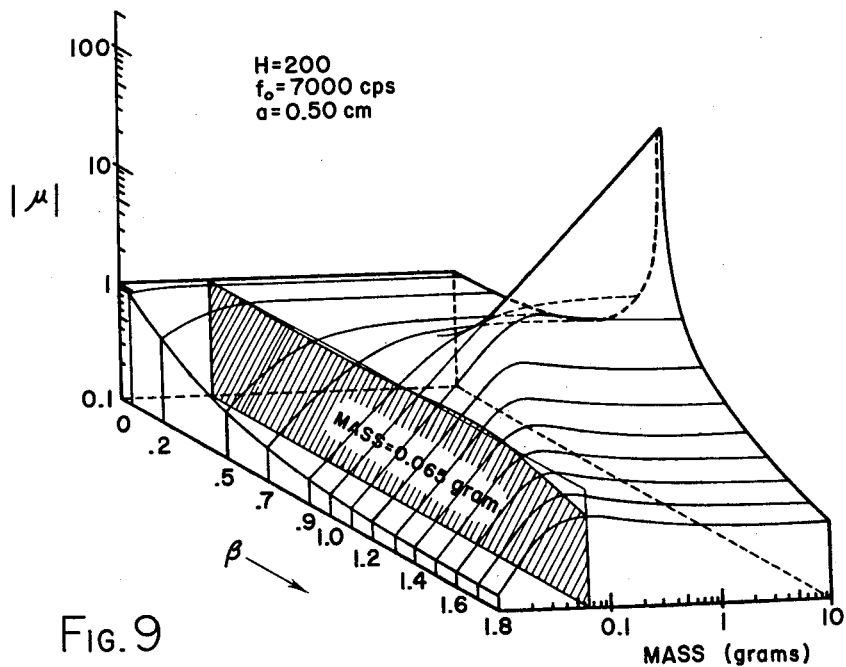

FIG. 9 is a three-dimensional representation showing how the mass of the movable member of a typical second order transducer system affects the frequency response obtained.

Figure 10:
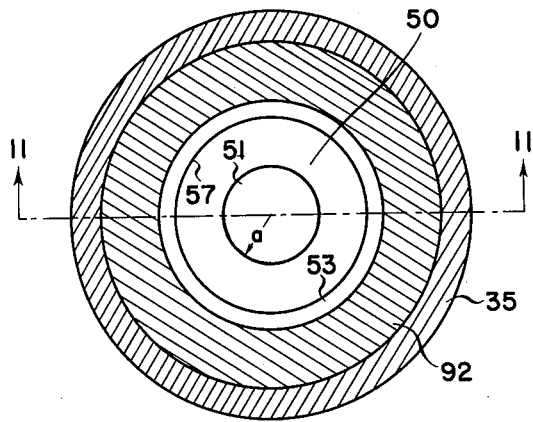
Figure 11:
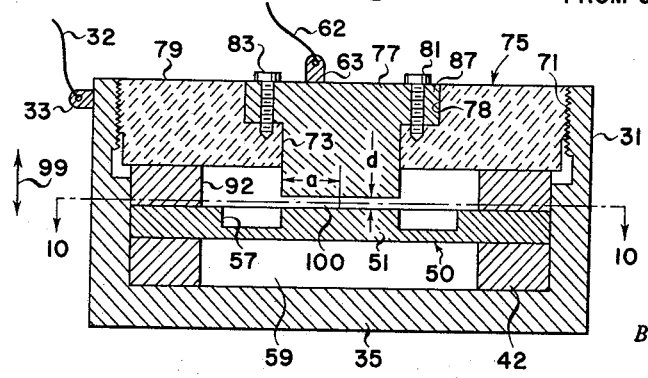

FIGS. 10 and 11 are respectively top and front cross-sectional views taken along the lines 11—11 and 10—10 of a specific structural embodiment of a capacitive accelerometer in accordance with the invention.

Like numerals represent like elements throughout the figures of the drawing.

Introduction

Improved transducers in accordance with the present invention are made possible by my discovery that if a fluid film is provided between a moving surface of a transducer and an adjacent stationary surface, the motion of the interspacial fluid as a result of relative motion between the surfaces, introduces forces which modify the stiffness and resistance factors of the transducer. These fluid film modifications in the stiffness and resistance factors are frequency dependent and can be adjusted to extend the operating frequency range of the transducer without any reduction in the inherent system sensitivity by proper choice of the geometry of the fluid film. Thus, a very much greater sensitivity can be provided in accordance with the invention because of the considerably smaller natural frequency which is required to provide a given operating frequency range, the system sensitivity being inversely proportional to the square of the natural frequency.

Dynamic Properties of a Fluid Film

In order to provide a better understanding of the invention, the dynamic properties of a fluid film will first be considered. For purposes of illustration and convenience air will hereinafter be used as the fluid film, but it is to be understood and will become apparent that various other fluids may also be successfully employed in accordance with the invention.

FIG. 1 is a schematic diagram which presents a physical picture of a fluid film between a stationary surface 20 and the lower surface of a rigid movable cylindrical mass or piston 12 which vibrates in the direction indicated by the arrows 11, that is perpendicular to the surface 20. As the mass 12 vibrates, air is forced in and out of the gap between the surface 20 and the lower surface of the piston 12 as indicated by the arrows 13. Because of the viscosity of the air, a resistance is offered to the motion of the piston 12. Also, because the air cannot move immediately, the pressure in the air varies resulting in an elastic force on the piston 12. From a qualitative viewpoint, it will be understood that at low frequencies the air has more time to move in and out of the gap, thereby permitting a relatively large air flow which introduces relatively large dissipative or resistive forces, while only relatively small elastic forces are introduced by pressure changes within the air film. On the other hand, at high frequencies a much smaller air flow is possible so that the resistive forces are relatively small while the elastic forces are increased due to increased pressure changes within the film.

If the total resistive forces of the air film acting on the piston 12 is now designated as a viscous damping resistance $c$ and the total elastic forces as a stiffness $k_a$, it can be shown that the values of $c$ and $k_a$ can be theoretically determined from the following expressions:

$$c = 2\frac{\pi a B}{\omega a d}\left[\frac{bei\alpha a \; bei'\alpha a + ber\alpha a \; ber'\alpha a}{ber^2\alpha a + bei^2\alpha a}\right] \quad (1)$$

$$k_a = \frac{\pi a^2 B}{d}\left[1 - \frac{2}{\alpha a}\frac{ber\alpha a \; bei'\alpha a - ber'\alpha a \; bei\alpha a}{ber^2\alpha a}\right] \quad (2)$$

where $a$ (FIG. 1) is the radius of the air film and also of the piston 12 in cm., $B$ is the atmospheric pressure in dynes/cm.$^2$, $\omega = 2\pi f$ is the angular frequency (1/sec.) of vibration of the piston 12, $d$ (FIG. 1) is the gap spacing in cm., and $\alpha$ is found from the expression $$\alpha = \left(\frac{12v\omega}{Bd^2}\right)^{1/2}\frac{1}{cm.}$$

where $v$ is the viscosity of air in dyne-sec./cm. The symbols $ber\alpha a$ and $bei\alpha a$ are the real and imaginary parts, respectively, of the Bessel function $J_0[(-j)^{1/2}\alpha a]$ and enter into the solution because of the axial symmetry of the air motion. These $ber$ and $bei$ functions and their derivatives $ber'$ and $bei'$ are available in tabular form (see H. G. Savidge, Phil. Mag. Ser. VI, 19, 49–58, January 1910).

For a constant pressure $B$ outside the air film, and a gas of constant viscosity $v$, Equations 1 and 2 above can be rewritten to give viscous damping resistance $c$ per unit radius $a$ and stiffness $k_a$ per unit radius $a$ which are functions only of the vibration frequency $f$ and the ratio $a/d$ (the ratio $a/d$ will hereinafter be designated as H). Consequently, families of curves can be generated of resistance $c$ per unit radius $a$ and stiffness $k_a$ per unit radius $a$ versus frequency $f$, where each curve is characterized by a particular value of H. Using values of B and $v$ corresponding to air at normal temperature and pressure (taken as 15° C. and 760 mm. Hg), the theoretical curves shown in FIGS. 2 and 3 were derived by programming Equations 1 and 2 on a digital computer.

From FIGS. 2 and 3 it can be seen that the values of the viscous damping resistance $c$ and the stiffness $k_a$ vary in opposite directions with the vibration frequency $f$, the resistance $c$ falling off by increasingly greater amounts with frequency as the value of H increases, while the stiffness $k_a$ rising substantially linearly with frequency throughout a wide range of values of H and then rising more slowly as H becomes large. I have found that by incorporating a fluid film in a second order transducer system, these frequency dependent fluid film parameters $c$ and $k_a$ whose variation with frequency is shown in FIGS. 2 and 3 may be appropriately adjusted by proper choice of H in conjunction with the natural frequency $f_0$ and constant stiffness $k_d$ of the second order system so as to permit the operating frequency range of the transducer to be appreciably extended.

*Conventional Second Order Transducer System*

Before explaining how a fluid film is incorporated into a second order transducer system in order to extend its operating frequency range, the characteristics of a conventional second order transducer system will be considered for comparison purposes. In these conventional second order transducer systems, the stiffness $k_d$ and the viscous damping resistance $c_d$ remain essentially constant with frequency. The stiffness $k_d$ may be the stiffness of a diaphragm of mass $m$ and will be related to the natural vibration frequency $f_0$ thereof. The viscous damping resistance $c_d$ may be a result of the resistance provided by the fluid in which the diaphragm is to vibrate. In such systems, sufficiently thin fluid films of appropriate geometry are not present to introduce significant frequency dependent effects.

The theory of a conventional second-order system with constant stiffness and constant damping is well known in the art and it can readily be shown that the relative response or dynamic amplification $|\mu|$ of the system is given by $$|\mu| = [(1-\beta^2)^2 + 4\zeta\beta^2]^{-1/2} \quad (3)$$

where $$\beta = f_0/f$$

and $$\zeta = c_d/c_{cr} = c_d/4\pi m f_0$$

Figure 4:
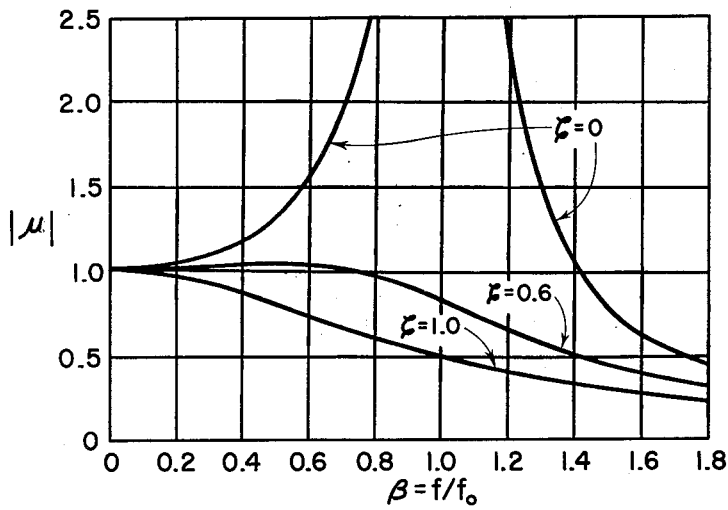
FIG. 4 is a graph showing theoretical frequency response curves of a conventional second order transducer system with constant viscous damping.

The dimensionless nature of the parameters in Equation 3 and the fact that $\zeta$ is independent of frequency makes it possible to represent the behavior of a second order system with constant stiffness $k_d$ and damping resistance $c_d$ by means of a family of curves, each curve being characterized by a particular value of $\zeta$. FIG. 4 is a graph of such curves with the dynamic amplification $|\mu|$ plotted versus $\beta$ for values of $\zeta$ of 0, 0.6 and 1.0. It is evident from these curves that even with an optimum value of $\zeta = 0.6$, the frequency response of a second order transducer system is substantially constant (within ±5%) up to a maximum value of $\beta$ of the order of 0.8.

*Theoretical Derivation of the Frequency Response Characteristics of a Second Order Transducer System Employing a Fluid Film in Accordance With the Invention*

Figure 5:
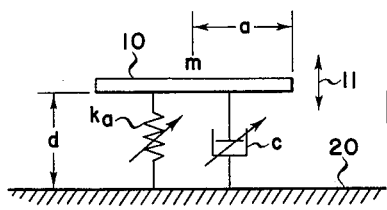
FIG. 5 is a schematic diagram of a basic second order transducer system incorporating a thin fluid film in accordance with the invention.

It will now be shown that this maximum value of $\beta$ for a second order transducer system can be extended to a value of the order of 1.5 by proper choice of the geometry of a fluid film incorporated in the system. FIG. 5 is a schematic diagram of a basic second order transducer system incorporating a thin fluid film in accordance with the invention.

In FIG. 5, the movable mass $m$ is indicated by a diaphragm 10 and an air film is formed between the underside of the diaphragm 10 and a surface 20. The stiffness $k_d$ of the diaphragm 10 determines the natural frequency $f_0$ of the system. In addition to the stiffness $k_d$, there is also present the frequency dependent stiffness $k_a$ and the viscous damping resistance $c$ illustrated in FIG. 5, both of which are introduced by the air film as explained previously.

The characteristics of the system of FIG. 5 will now be theoretically derived assuming a force $F \cos \omega t$ acts on the effective moving mass $m$ of the transducer. In the case of a pressure transducer, this force would be the product of the pressure to be measured and the active area of the transducer, and in the case of an accelerometer the force would be the product of the seismic mass of the transducer and the acceleration of the base of the transducer.

Writing $k = k_a + k_d$, the equation of motion is:

$$m\ddot{x} + c\dot{x} + kx = F \cos \omega t \quad (4)$$

and the solution of Equation 4 is:

$$x = X \cos(\omega t + \phi)$$

where $$X = \frac{F}{(k-m\omega^2) + jc\omega} \quad (5)$$

Under static conditions, the air stiffness plays no part and the static deflection $x_{st}$ can be written as:

$$x_{st} = F/kd$$

In the conventional way, the expressions for $W_0$, $\beta$ and $\zeta$ are:

$$W_0 = 2\pi f_0 = (kd/m)^{1/2}$$
$$\beta = f/f_0$$
$$\zeta = c/c_{cr} = c/2m\omega_0 = c/4\pi m f_0$$

and the stiffness ratio $n$ is defined as:

$$n = k_a/k_d \quad (6)$$

Then from Equations 5 and 6 above, the equation for the dynamic amplification factor $|\mu|$ can be derived as follows:

$$|\mu| = [(1+n-\beta^2)^2 + 4\zeta^2\beta^2]^{-1/2} \quad (7)$$

in which $n$ and $\zeta$ are frequency dependent and their values will affect the frequency response of the transducer.

Now that the frequency response of the transducer has been made frequency dependent by the introduction of an air film, the problem of determining the particular geometry of the air film which wil significantly improve the frequency response of the transducer still remains. This is accomplished in accordance with the present invention as follows.

Using the definitions for $n$ and $\zeta$ given previously, Equations 1 and 2 can be manipulated so as to put them into a form from which conditions will become apparent which are necessary to make $n$ and $\zeta$ independent of the natural frequency $f_0$ and thus functions of $\beta$ alone. The resulting equations are then as follows:

$$\zeta = K_1 \frac{a}{f_0^{5/2} \beta_m^{3/2} m} \left[ \frac{bei K_2 H(f_0\beta)^{1/2} bei^1 K_2 H(f_0\beta)^{1/2} + ber K_2 H(f_0\beta)^{1/2} ber^1 K_2 H(f_0\beta)^{1/2}}{ber^2 K_2 H(f_0\beta)^{1/2} + bei^2 K_2 H(f_0\beta)^{1/2}} \right] \quad (8)$$

$$n - K_3 = \frac{aH}{mf_0^2} \left[ 1 - \frac{2}{K_2 H(f_0\beta)^{1/2}} \frac{ber K_2 H(f_0\beta)^{1/2} bei^1 K_2 H(f_0\beta)^{1/2} - ber^1 K_2(f_0\beta)^{1/2} bei K_2(f_0\beta)^{1/2}}{ber^2 K_2 H(f_0\beta)^{1/2} + bei^2 K_2 H(f_0\beta)^{1/2}} \right] \quad (9)$$

where $K_1$, $K_2$ and $K_3$ are dimensional coefficients which depend on ambient pressure B, fluid viscosity $v$, and radius $a$, and which are independent of frequency.

Inspection of Equations 8 and 9 will reveal that since the values of $H^2 f_0$ and $H^5 a/m$ in any system are constant, $n$ and $\zeta$ can be made functions of $\beta$ alone so that Equations 8 and 9 can be represented as:

$$\zeta = F_1(\beta)$$
$$n = F_2(\beta)$$

and from Equation 7, $|\mu|$ can be represented as:

$$|\mu| = F_3(\beta)$$

A family of curves of $|\mu|$ versus $\beta$ can now be plotted, each curve being characterized by particular values of $H^2 f_0$ and $H^5 a/m$. In the sense that the shapes of these curves depend only upon the values of $H^2 f_0$ and $H^5 a/m$ and are independent of the particular values of H, $f_0$, and $a/m$, these curves for the second order transducer system with a fluid film are universal and are analogous to the curves of FIG. 4 for a conventional second order transducer system.

Figure 6:
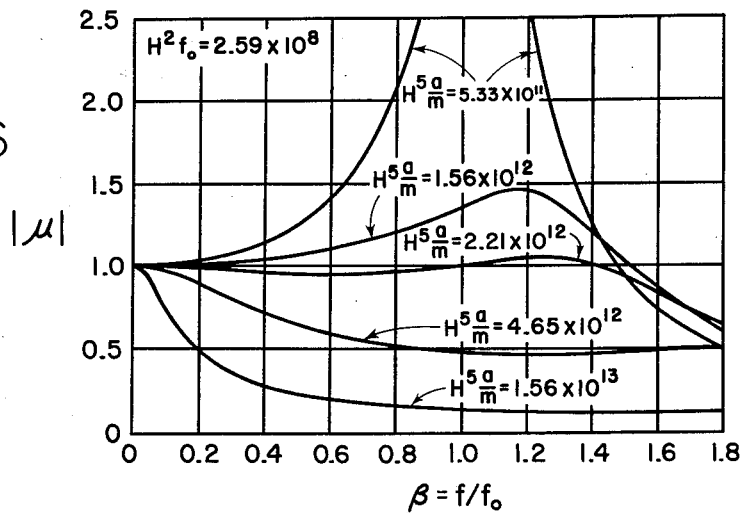
FIG. 6 is a graph showing typical theoretical frequency response curves of a second order transducer system in the presence of a fluid film.

A few of the response curves of $|\mu|$ versus $\beta$ which may be derived for the second order transducer system with a fluid film are plotted in the graph of FIG. 6 for a value of $H^2 f_0 = 2.59 \times 10^8$ and values of $H^5 a/m$ as shown. The data necessary to plot these curves were obtained by programming Equations 8, 9 for solution using a digital computer. The values of the constants $K_1$, $K_2$ and $K_3$ were derived by considering air at 15° C. and 760 mm. Hg to give $$K_1 = 8.06 \times 10^4 \text{ dyne-cm.}^{-2} \text{ sec.}^{-\frac{1}{2}}$$
$$K_2 = 2.315 \times 10^{-4} \text{ sec.}^{\frac{1}{2}}$$
$$K_3 = 6.96 \times 10^8 \text{ dyne/cm.}^2$$

From FIG. 6 it can be seen that for $H^2 f_0 = 2.59 \times 10^8$ the best frequency response is achieved for the curve corresponding to $H^5 a/m = 2.21 \times 10^{12}$ cm./gram. For these values, the response of the system is constant within $\pm 5\%$ for frequencies up to about $\beta = 1.5$, which is a very significant improvement over the conventional second order system whose response with optimum $\zeta = 0.6$ is constant within $\pm 5\%$ only up to about $\beta = 0.8$. Since the sensitivity of a second order system is inversely proportional to $f_0^2$, this much larger value of $\beta$ makes possible an increase in sensitivity of nearly 4 to 1 for a given frequency range. If the conventional second order system has no damping corresponding to $\zeta = 0$, a constant frequency response within $\pm 5\%$ will be obtained only up to $\beta = 0.2$, which means that the fluid film second order system of this invention will provide an increase in sensitivity of greater than 50 to 1. It is well known that satisfactory damping is most difficult to achieve in second order systems at high frequencies.

Figure 7:
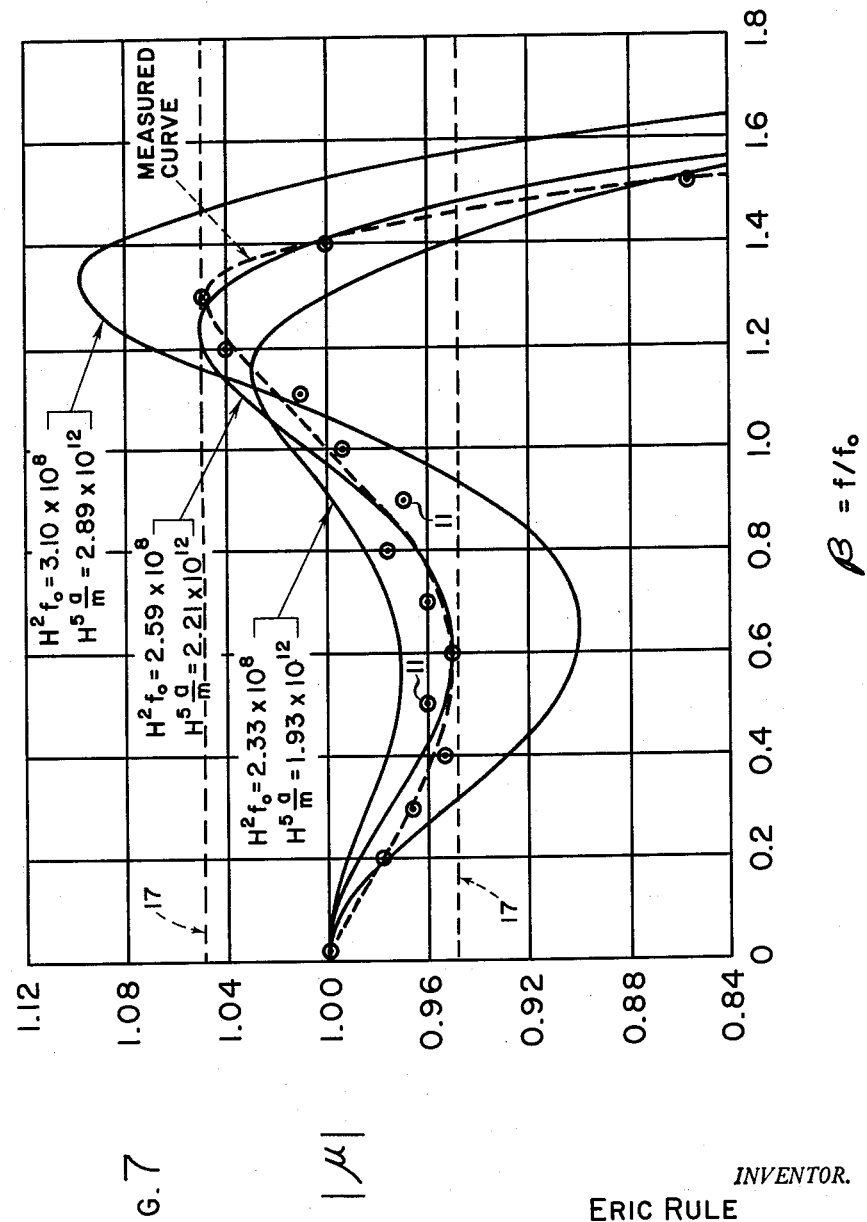
FIG. 7 is a graph showing typical optimum frequency response curves of a second order transducer system employing a fluid film in accordance with the invention.

The graph of FIG. 7 shows the calculated optimum curve of FIG. 6 plotted in more detail on an expanded $|\mu|$ scale extending from $|\mu| = 0.84$ to $|\mu| = 1.12$. Also shown in FIG. 7 are two other optimum curves which have been calculated for other values of $H^2 f_0$ and values of $H^5 a/m$ as shown. The points plotted in the graph of FIG. 7 and the dashed curve drawn therethrough show an actual measured response curve obtained for the embodiment of FIGS. 10 and 11 which will hereinafter be described. The $\pm 5\%$ variation limits in $|\mu|$ are indicated by the dashed lines 17.

*Design of a Second Order Transducer System Employing a Fluid Film in Accordance With the Invention*

The typical theoretical optimum frequency response characteristics of FIG. 7 can be cross-plotted so as to provide the data necessary to conveniently design a second order transducer system incorporating an air film in accordance with the invention. Such cross-plotted graphs are shown in FIG. 8 where $\beta_{max}$, $H^2 f_0$ and $H^5 a/m$ have been plotted against the maximum allowed percentage deviation in response. In using these graphs, the designer first decides what deviation from a flat response can be tolerated and the frequency range over which the transducer is to operate. The value of $\beta_{max}$ can then be obtained from the lower graph of FIG. 8 and the required value of $f_0 = f/\beta$ calculated. The value of $H^2 f_0$, and therefore the value of H can then be obtained from the middle graph of FIG. 8, and finally the value of $H^5 a/m$ and therefore of $a/m$ can be obtained from the upper graph of FIG. 8. The proper values of $f_0$, H and $a/m$ are now known and the system can be designed. For most systems it will be found that $H = a/d$ should be at least greater than 50 in order to permit the fluid film to provide a significant improvement in frequency response.

Restrictions on the permitted size of the transducer will ordinarily determine the value of $a$ and in making this determination it is helpful to study how the response curve changes with $m$. This is made possible by a typical three dimensional representation such as shown in FIG. 9. The particular case illustrated in FIG. 9 is for $H = 200$, $f_0 = 7000$ c.p.s. and $a = 0.50$, the optimum value of $m$ being 0.065 gram.

It is to be understood that the numerical values in FIGS. 6–9 apply only to the case where air is at 15° C. and 760 mm. of Hg. The curves appropriate to other conditions or fluids can be derived by substituting appropriate values for $K_1$, $K_2$ and $K_3$ into Equations 8 and 9 and suitably programming a digital computer to obtain the new equations. It will be appreciated, however, that because the temperature coefficient of viscosity is relatively small for gases such as air, a second order transducer system incorporating a gas fluid film in accordance with the invention will be successfully operable with the advantages stated over a very wide temperature range.

*Description of a Typical Embodiment of a Second Order Transducer System Employing a Fluid Film in Accordance With the Invention*

FIGS. 10 and 11 illustrate a typical structural embodiment of a capacitive accelerometer in accordance with the invention. In FIGS. 10 and 11, a cup-shaped casing 35 is adapted to contain therein in the following order beginning from the bottom of the cup: a metal spacing washer 42, a disk-shaped metal diaphragm 50 having a predetermined natural frequency $f_0$, a second metal spacing washer 92, and a cylindrically-shaped cover member 75 which is adapted to be screwed into the cup to rigidly hold the assembly by means of threads 71 internally on the top portion of the cup casing 35 and externally on the member 75. The disk-shaped diaphragm 50 has a ring 57 cut in the top surface therof, the depth of the ring 57 being adjusted to provide the desired natural frequency $f_0$ of the diaphragm 50. The diaphragm 50 is rigidly held between the washers 42 and 92 by the pressure of the screwed-in cover member 75.

The cylindrically-shaped cover member 75 comprises a cylindrical non-conductive body 79 having a coaxial bore 73 and a coaxial counter bore 78 therein in which a cylindrical metal member 77 is rigidly mounted by means of screws 81 and 83 passing through a shoulder 87 of the member 77 into threaded holes in the counterbored surface in the non-conductive body 79 as shown in FIG. 11. The cylindrical metal member 77 extends beyond the non-conductive member 79 and forms a parallel surface adjacent the center portion 51 of the diaphragm 50, the air gap 100 therebetween serving as the air film which will be employed to obtain a large operating frequency range for the transducer. The radius of the end surface of the metal member 77 will thus be the radius $a$ of the air film referred to in the previously given equations and the thickness of the air film 100 will be $d$, as indicated in FIGS. 10 and 11.

Using the graphs of FIG. 8, the values of $a$ and $d$ in the specific embodiment of FIGS. 10 and 11 may now be chosen in conjunction with the natural frequency $f_0$ and the mass $m$ of the diaphragm 50 to provide the optimum frequency response characteristic for the transducer.

In operation, the capacitive accelerometer of FIGS. 10 and 11 is located so that the applied acceleration, indicated by the arrows 99, is substantially perpendicular to the plane of the diaphragm 50 as shown in FIG. 11. The applied acceleration causes corresponding vibration of the diaphragm 50 which alters the electrical capacitance appearing between the diaphragm 50 and the metal member 77 in accordance with the applied acceleration. The capacitive accelerometer may be electrically connected with associated circuitry by means of lead wires 32 and 62 soldered to terminals 33 and 63 on the metal member 77 and the casing 35, respectively.

In a specific capacitive accelerometer designed in a manner basically similar to that shown in FIGS. 10 and 11, the following values of $f_0$, $a$, $m$, $d$ and thus H were employed:

$f_0 = 1668$ cycles per second
$a = 0.5$ cm.
$m = 2.145$ gm.
$d = 1.27 \times 10^{-3}$ cm.
$H = a/d = 394$ Using the above values the measured points 11 shown in the graph of FIG. 7 were obtained and the dashed curve drawn therethrough. The theoretical curve aimed at is the middle curve for $H^2 f_0 = 2.59 \times 10^8$ and $$H^5 a/m = 2.21 \times 10^{12}$$

It can be seen that the measured curve is in good agreement with the theoretical curve.

Further information with regard to this invention may be found in an article of which I am a co-author entitled "Second Order Instrumentation Systems With Frequency-Dependent Stiffness and Damping," Journal of the Acoustical Society of America, vol. 31, No. 11, November 1959, page 1457.

It is to be understood in connection with this invention that the application of a fluid film for improving the sensitivity and/or frequency response of a second order transducer system is not limited to the particular second order sytems exemplified herein and many modifications and variations in construction and arrangement are possible. In fact, the sensitivity and frequency response of even piezoelectric type accelerometers could be improved by the use of an appropriate fluid film, since its generated output voltage is dependent upon its amplitude and frequency of vibration. Also, instead of using cylindrical fluid films as described herein, fluid films of other geometries could be employed. Furthermore, a number of fluid films could be incorporated in a single second order transducer system.

The present invention, therefore is to be considered as including all possible constructions and arrangements coming within the scope of the invention as defined in the appended claims.

I claim as my invention:

1. In a second order transducer system including a mass adapted to move in response to applied forces, the improvement comprising: a surface provided adjacent and substantially parallel to and as large in area as a surface of said mass and substantially normal to the direction of the applied force so as to provide a fluid film therebetween having a ratio of area to thickness chosen so that said fluid film exerts frequency-dependent forces on said mass which act to improve the frequency response of said system, said fluid having free ingress and egress from the space between said mass and said surface adjacent and substantially parallel thereto.

2. In a second order transducer including a disk-shaped diaphragm of mass $m$ and natural frequency $f_0$ adapted to vibrate in response to applied forces, the improvement comprising: means for maintaining a rigid circular surface adjacent and substantially parallel and coaxial to said diaphragm so as to provide a cylindrical air film of radius $a$ and thickness $d$ therebetween, the values of $f_0$, $m$, $a$ and $d$ being chosen in accordance with the dynamic equations of motion of said system so that said air film exerts frequency-dependent forces on said diaphragm which act to improve the frequency response of said system, the value of $(a/d)^2 f_0$ being between $2.2 \times 10^8 (\text{sec.}^{-1})$ and $3.2 \times 10^8 (\text{sec.}^{-1})$, and the value of $(a/d)^5 a/m$ being between $1.8 \times 10^{12}$ (cm./gram) and $3.0 \times 10^{12}$ (cm./gram).

3. In a second order transducer including a disk-shaped diaphragm of mass $m$ and natural frequency $f_0$ adapted to vibrate in response to applied forces, the improvement comprising: means for maintaining a rigid circular surface adjacent and substantially parallel and coaxial to said diaphragm so as to provide a cylindrical air film of radius $a$ and thickness $d$ therebetween, the values of $f_0$, $m$, $a$ and $d$ being chosen in accordance with the dynamic equations of motion of said system so that said air film exerts frequency-dependent forces on said diaphragm which act to improve the frequency response of said system, the value of $(a/d)^2 f_0$ being substantially chosen for a desired percent maximum deviation D and a desired maximum ratio $\beta_{max}$ by means of a $(a/d)^2 f_0$ vs. D curve approximately passing through the points:

$D = 3.5\%, \quad (a/d)^2 f_0 = 2.4 \times 10^8 (\text{sec.}^{-1})$
$D = 5.0\%, \quad (a/d)^2 f_0 = 2.6 \times 10^8 (\text{sec.}^{-1})$
$D = 7.0\%, \quad (a/d)^2 f_0 = 2.8 \times 10^8 (\text{sec.}^{-1})$
$D = 9.0\%, \quad (a/d)^2 f_0 = 3.0 \times 10^8 (\text{sec.}^{-1})$ and the value of $(a/d)^5 (a/m)$ being chosen for substantially the same deviation D and $\beta_{max}$ by means of a $(a/d)^5 (a/m)$ vs. D curve approximately passing through the points:

$D = 3.5\%, (a/d)^5 (a/m) = 2.0 \times 10^{12} (\text{cm./gram.})$
$D = 5.0\%, (a/d)^5 (a/m) = 2.2 \times 10^{12} (\text{cm./gram})$
$D = 6.5\%, (a/d)^5 (a/m) = 2.4 \times 10^{12} (\text{cm./gram.})$
$D = 9.4\%, (a/d)^5 (a/m) = 2.8 \times 10^{12} (\text{cm./gram.})$ the relationship between $\beta_{max}$ and D following a curve approximately passing through the points:

$D = 3.0\%, \quad \beta_{max} = 1.38$
$D = 5.0\%, \quad \beta_{max} = 1.48$
$D = 7.0\%, \quad \beta_{max} = 1.54$
$D = 9.0\%, \quad \beta_{max} = 1.59$ 4. The invention of claim 3 having an electrically conductive face on said diaphragm, an electrically conductive face on said rigid circular surface, a first electrical terminal, a second electrical terminal, means for connecting first said face to said first electrical terminal, and means for connecting second said face to said second electrical terminal.

5. A transducer for responding to oscillatory movement comprising a body, means attached to said body for movement therewith, said last named means having a substantially flat face in a plane substantially normal to the direction of movement of said body, resilient means attached to said body having a substantially flat face adjacent and substantially parallel to said first face, whereby a gap is formed between said two faces, at least one of said faces being of substantially circular cross-section and the radius of said circular face being at least fifty times the thickness of said gap, a fluid in said gap, said fluid having free ingress and egress from the gap between said two faces, and means responsive to the movement of said resilient means.

6. A capacitive accelerometer comprising a body, means attached to said body for movement therewith, said last named means having a substantially flat face of an electrically conductive material in a plane substantially normal to the direction of movement of said body, resilient means attached to said body having a substantially flat face of an electrically conductive material adjacent and substantially parallel to first said face, whereby a gap is formed between said two faces, at least one of said faces being of substantially circular cross-section and the radius of said circular face being at least fifty times the thickness of said gap, a fluid in said gap, said film having free ingress and egress from the gap between said two faces, a first electrical terminal, a second electrical terminal, means for connecting first said face to said first electrical terminal, and means for connecting said second face to said second electrical terminal.

References Cited in the file of this patent

UNITED STATES PATENTS

| | | |
|---|---|---|
| 2,332,994 | Draper | Oct. 26, 1943 |
| 2,867,706 | Statham | Jan. 6, 1959 |
| 2,909,364 | Stedman | Oct. 20, 1959 |
| 2,966,802 | Steen | Jan. 3, 1961 |